United States Patent
Kurapati et al.

(10) Patent No.: US 8,185,947 B2
(45) Date of Patent: May 22, 2012

(54) SYSTEM, METHOD AND APPARATUS FOR SECURELY EXCHANGING SECURITY KEYS AND MONITORING LINKS IN A IP COMMUNICATIONS NETWORK

(75) Inventors: Srikrishna Kurapati, Richardson, TX (US); Sudhindra Pundaleeka Herle, Dallas, TX (US)

(73) Assignee: Avaya Inc., Basking Ridge, NJ (US)

( * ) Notice: Subject to any disclaimer, the term of this patent is extended or adjusted under 35 U.S.C. 154(b) by 1026 days.

(21) Appl. No.: 11/776,509

(22) Filed: Jul. 11, 2007

(65) Prior Publication Data

US 2008/0016334 A1    Jan. 17, 2008

Related U.S. Application Data

(60) Provisional application No. 60/830,168, filed on Jul. 12, 2006.

(51) Int. Cl.
*G06F 9/00* (2006.01)
*H04L 29/06* (2006.01)
*H04L 9/32* (2006.01)
*H04L 9/00* (2006.01)
*H04L 9/08* (2006.01)

(52) U.S. Cl. ............ 726/15; 726/11; 726/12; 726/14; 713/150; 713/168; 713/171; 380/277; 380/278

(58) Field of Classification Search ............ 713/155, 713/171, 151, 150, 168; 726/11, 12, 14, 726/15; 380/277, 278
See application file for complete search history.

(56) References Cited

U.S. PATENT DOCUMENTS

| | | | |
|---|---|---|---|
| 6,253,326 B1 * | 6/2001 | Lincke et al. | 726/12 |
| 6,363,065 B1 | 3/2002 | Thornton et al. | |
| 6,501,763 B1 | 12/2002 | Bhagavath et al. | |
| 6,598,183 B1 | 7/2003 | Grieco et al. | |
| 6,665,293 B2 | 12/2003 | Thornton et al. | |
| 6,721,424 B1 * | 4/2004 | Radatti | 380/286 |
| 6,757,823 B1 | 6/2004 | Rao et al. | |
| 6,769,016 B2 | 7/2004 | Rothwell et al. | |
| 6,781,955 B2 | 8/2004 | Leung | |
| 6,842,449 B2 | 1/2005 | Hardjono | |
| 7,055,027 B1 * | 5/2006 | Gunter et al. | 713/151 |
| 7,181,010 B2 | 2/2007 | Russ et al. | |
| 7,206,932 B1 * | 4/2007 | Kirchhoff | 713/152 |
| 7,313,816 B2 * | 12/2007 | Sinha et al. | 726/10 |
| 7,330,968 B2 * | 2/2008 | Kimura | 713/153 |
| 7,454,421 B2 * | 11/2008 | Imaeda et al. | 1/1 |

(Continued)

OTHER PUBLICATIONS

Stein, L D. and Stewart, J. N., "The World Wide Web Security FAQ, Version 31.2, Feb. 4, 2002," http://www.w3.org/Security/Faq/.

(Continued)

*Primary Examiner* — Mohammad Reza
(74) *Attorney, Agent, or Firm* — Sheridan Ross P.C.

(57) ABSTRACT

The present invention provides a system, method and apparatus for securely exchanging security keys and monitoring links in an IP communications network. The apparatus is disposed between the local device and the remote device and receives a security key associated with the secure communication(s) for the local device. The apparatus then uses the security key to decode one or more messages transmitted between the local device and the remote device. The apparatus may initiate one or more security protocols whenever the decoded message(s) satisfy one or more criteria. Note that the present invention can be implemented as a computer program embodied on a computer readable medium wherein each step is performed by one or more code segments.

21 Claims, 6 Drawing Sheets

U.S. PATENT DOCUMENTS

| | | |
|---|---|---|
| 7,543,332 B2 * | 6/2009 | Balissat et al. .................. 726/15 |
| 2002/0129236 A1 | 9/2002 | Nuutinen |
| 2003/0009699 A1 | 1/2003 | Gupta et al. |
| 2003/0061479 A1 * | 3/2003 | Kimura ......................... 713/153 |
| 2004/0062399 A1 * | 4/2004 | Takase .......................... 380/277 |
| 2004/0083299 A1 | 4/2004 | Dietz et al. |
| 2004/0086093 A1 | 5/2004 | Schranz |
| 2004/0161086 A1 | 8/2004 | Buntin et al. |
| 2004/0260560 A1 | 12/2004 | Holloway et al. |
| 2005/0015488 A1 | 1/2005 | Bayyapu |
| 2005/0132060 A1 | 6/2005 | Mo et al. |
| 2005/0201363 A1 | 9/2005 | Gilchrist et al. |
| 2005/0259667 A1 | 11/2005 | Vinokurov et al. |
| 2006/0028980 A1 | 2/2006 | Wright |
| 2006/0036727 A1 | 2/2006 | Kurapati et al. |
| 2006/0288411 A1 | 12/2006 | Garg et al. |
| 2007/0076853 A1 | 4/2007 | Kurapati et al. |
| 2007/0121596 A1 | 5/2007 | Kurapati et al. |
| 2007/0248091 A1 * | 10/2007 | Khalid et al. ................. 370/392 |
| 2008/0016515 A1 | 1/2008 | Naim et al. |

OTHER PUBLICATIONS

Tyson, Jeff and Valdes, Robert, "How VoIP Works" http://computer.howstuffworks.com/ip-telephony.htm.

International Search Report and Written Opinion of the International Searching Authority for PCT/US2006/035903 dated Apr. 23, 2007.

International Search Report and Written Opinion of the International Searching Authority for PCT/US2006/031499 dated May 24, 2007.

International Search Report and Written Opinion for PCT/US2007/073290 dated Apr. 15, 2008.

International Search Report and Written Opinion for PCT/US2007/073298 dated Aug. 21, 2008.

* cited by examiner

SYSTEM, METHOD AND APPARATUS FOR SECURELY EXCHANGING SECURITY KEYS AND MONITORING LINKS IN A IP COMMUNICATIONS NETWORK

PRIORITY CLAIM TO RELATED APPLICATIONS

This patent application is a non-provisional application of U.S. provisional patent application 60/830,168 filed on Jul. 12, 2006 and entitled "System, Method and Apparatus for Securely Exchanging Security Keys and Monitoring Links in an IP Communications Network" which is hereby incorporated by reference in its entirety.

CROSS-REFERENCE TO RELATED APPLICATIONS

This application is related to U.S. patent application Ser. No. 11/776,549 filed on Jul. 11, 2007 and entitled "System, Method and Apparatus for Troubleshooting an IP Network" which claims priority to U.S. provisional patent application 60/830,411 filed on Jul. 12, 2006 and entitled "System, Method and Apparatus for Troubleshooting an IP Network", all of which are hereby incorporated by reference in its entirety, all of which are incorporated herein by reference.

FIELD OF THE INVENTION

The present invention relates generally to the field of communications and, more particularly, to a system, method and apparatus for securely exchanging security keys and monitoring links in an IP communications network.

BACKGROUND OF THE INVENTION

A communications system, particularly one connected to a publicly accessible network, generally has flaws that can be exploited to render all or portions of the system unusable. Security Measures are generally implemented as part of the network services to provide secure and private communication between peers and between the network and the end user. One example that provides such a secure connection is establishing what is known as an IPSec (Internet Protocol Security) tunnel between the end user and a network entity in the core network. The IPSec tunnel is established over the publicly available access network to provide secure communication line between the end user and the core network. The security provided by the IPSec focuses on protecting the content and the information exchanged between the end user and the network and protects against eavesdropping.

A high level view of the establishment of an IPSec tunnel 100 between an end user 102 and a trusted network entity 104 in a core network 106 in accordance with the prior art is shown in FIG. 1. The end user 102 is communicably coupled to the private core network 106 via public Internet access network 108, access router 110 and trusted network entity 104. The private core network 106 may also include other entities communicably coupled to the trusted network entity 104 and/or one another, such as IP-IP Gateway 112, SIP Server 114, Call Server 116 and Media Gateway 118. Private operation core network 120 entities may also be communicably coupled to the private core network 106, such as AAA Server 122, HSS Server 124, Application Server 126 and Billing 128. There are other security areas that are covered through means other than IPSec, but they are not relevant to the present discussion. One of many specific elements that the IPSec tunnel 100 establishment procedure requires is a Security Key that is exchanged between the trusted network entity 104 in the core network 106 and the end user 102. That security key is created by the trusted network entity 104 and given to the end user 102 to use during the current session. The Security Key is used as part of an encryption algorithm that the end user 102 applies on each IP (Internet Protocol) packet before sending it to the core network 106 over the public access network 108. Only the trusted network entity 104 and the end user 102 are aware of the Security Key value, and hence they can decode the packets exchanged over the public access network 108.

There are other network entities in the network that play an important role in providing security in different domains, such as network security, application level security, Operating System security, Internet Protocol level security and many others. In order to provide a full suite of security services, a network node needs to be able read and decode all messages exchanged between the end user 102 and the core network 106. Currently, the application level security node does not have access to the Security Key exchange between the end user 102 and the corresponding network entity 104. As a result a system, method and apparatus for monitoring one or more secure communications in a network using the Security Key is needed.

SUMMARY OF THE INVENTION

The present invention provides a system, method and apparatus for securely exchanging Security Keys and monitoring links in an IP communications network. The solution provides the following advantages: (1) the Security Key is never exposed to the public network; (2) the Security Key is kept safe inside the network entities once exchanged and can never be read even if the hardware is tampered with; and (3) Security Key exchange on a per session and per call basis (where the security key changes for every call) is supported. In order to detect any anomalies that may be triggered, the present invention decodes all messages at the application level security node. This sharing of ephemeral security key material is a critical need for security products because it allows the operator to deploy multiple, best-of-breed, security products from different vendors and provides better correlation of security events.

More specifically, the present invention provides a method for monitoring one or more secure communications between a local device and a remote device by receiving a security key associated with the secure communication(s) at a security device disposed between the local device and the remote device and decoding one or more messages transmitted between the local device and the remote device using the security key. Note that the present invention can be implemented as a computer program embodied on a computer readable medium wherein each step is performed by one or more code segments.

The present invention also provides a method for monitoring one or more secure communications between a local device and a remote device by establishing a persistent connection between a security device and the local device wherein the security device is disposed between the local device and the remote device, and establishing a secure communication channel between the security device and the local device. A security key associated with the secure communication(s) is received at the security device and the security key is stored. One or more messages transmitted between the local device and the remote device are decoded using the security key, and one or more security protocols are initiate whenever the decoded message(s) satisfy one or more criteria. Note that the present invention can be implemented as a computer program embodied on a computer readable medium wherein each step is performed by one or more code segments.

In addition, the present invention provides an apparatus for monitoring one or more secure communications between a local device and a remote device. The apparatus includes a first interface, a second interface, a secure data storage and a processor communicably coupled to the first interface, the second interface and the secure data storage. The processor receives a security key associated with the secure communication(s) at the first interface, stores the security key in the secure data storage and decodes one or more messages via the second interface using the security key that are transmitted between the local device and the remote device using the security key.

The present invention also provides a security device for monitoring one or more secure communications between a local device and a remote device. The apparatus includes a first interface, a second interface, a secure data storage and a processor communicably coupled to the first interface, the second interface and the secure data storage. The processor establishes a persistent connection with the local device, establishes a secure communication channel with the local device, receives a security key associated with the secure communication(s) at the first interface, stores the security key in the secure data storage, decodes one or more messages via the second interface using the security key that are transmitted between the local device and the remote device and initiates one or more security protocols whenever the decoded message(s) satisfy one or more criteria.

Moreover, the present invention provides a system that includes a network, a remote device, a local device communicably coupled to the remote device via the network to engage in one or more secure communications, and a security device disposed between the local device and the remote device. The security device includes a first interface, a second interface, a secure data storage, and a processor communicably coupled to the first interface, the second interface and the secure data storage. The processor receives a security key associated with the secure communication(s) at the first interface, stores the security key in the secure data storage and decodes one or more messages via the second interface using the security key that are transmitted between the local device and the remote device using the security key.

The present invention also provides a system that includes a network, a remote device, a local device communicably coupled to the remote device via the network to engage in one or more secure communications, and a security device disposed between the local device and the remote device. The security device includes a first interface, a second interface, a secure data storage, and a processor communicably coupled to the first interface, the second interface and the secure data storage. The processor establishes a persistent connection with the local device, establishes a secure communication channel with the local device, receives a security key associated with the secure communication(s) at the first interface, stores the security key in the secure data storage, decodes one or more messages via the second interface using the security key that are transmitted between the local device and the remote device and initiates one or more security protocols whenever the decoded message(s) satisfy one or more criteria.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
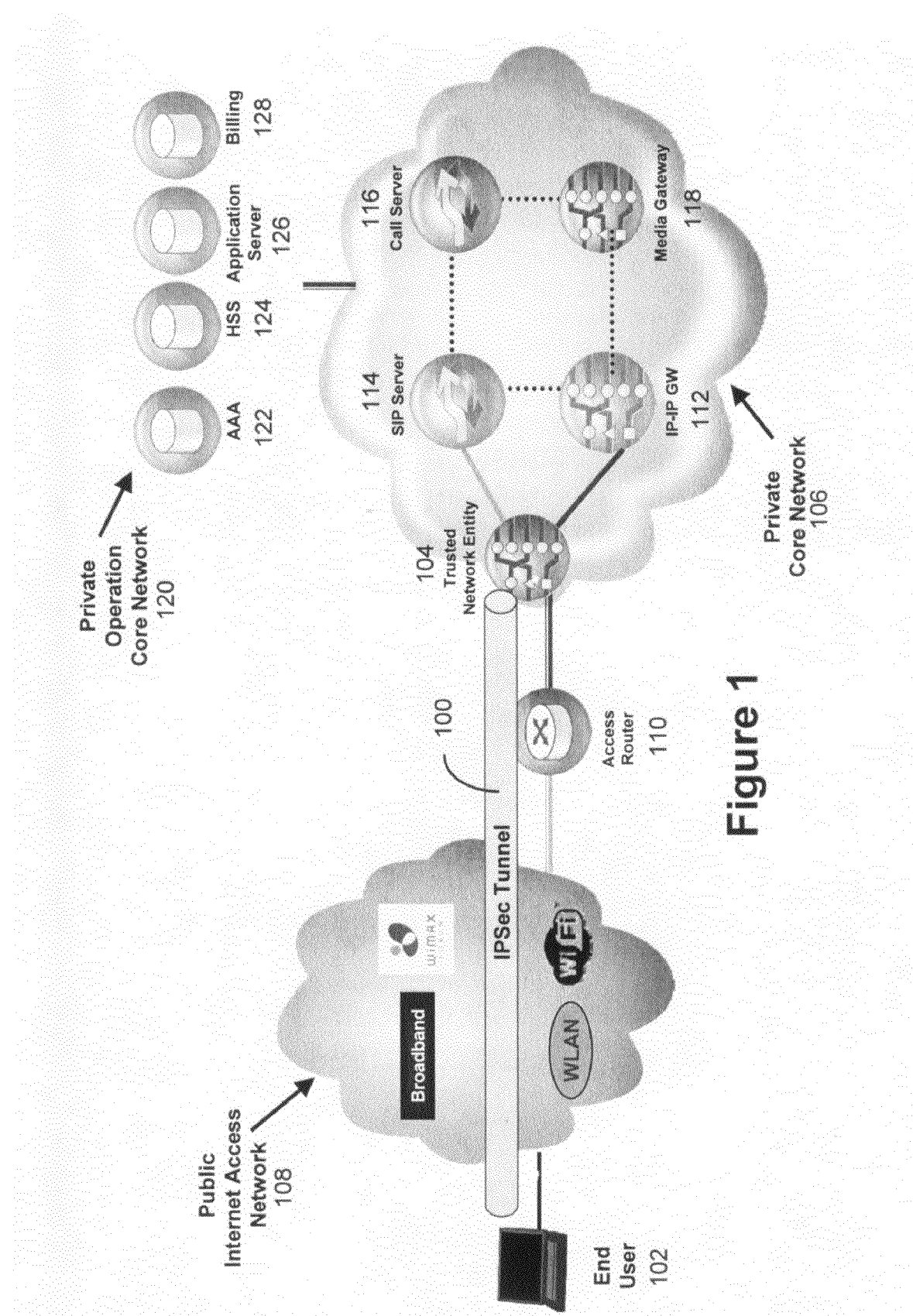
FIG. 1 depicts the establishment of an IPSec tunnel between an end user and a trusted network entity in a core network in accordance with the prior art.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to the processing of packet-based communications, but it will be understood that the concepts of the present invention are applicable to any fast and memory efficient statistics maintenance that requires aggregation based on a common key prefix.

The present invention provides system, method and apparatus for securely exchanging Security Keys and monitoring links in an IP communications network. The solution provides the following advantages: (1) the Security Key is never exposed to the public network; (2) the Security Key is kept safe inside the network entities once exchanged and can never be read even if the hardware is tampered with; and (3) Security Key exchange on a per session and per call basis (where the security key changes for every call) is supported. In order to detect any anomalies that may be triggered, the present invention decodes all messages at the application level security node. This sharing of ephemeral security key material is a critical need for security products because it allows the operator to deploy multiple, best-of-breed, security products from different vendors and provides better correlation of security events. Note that the present invention can be implemented in the "System and Method for Providing Network Level and Nodal Level Vulnerability Protection in VoIP Networks" described in U.S. Patent Publication No. US-2007-01215960A1 published on May 31, 2007, which is incorporated herein in its entirety.

As used herein, IMS (IP Multimedia Subsystem) is used as an example of a network technology to describe the solution. It is important to note that the invention still applies to any core network technology that uses IP as the transport layer for communication between the network entities. For instance, Unlicensed Mobile Access (UMA) network technology also applies to the current invention solution described herein. In addition, wireless access and wireless applications are used as example to describe the invention; however, the invention still applies to any access network and any application type that utilizes IP. Moreover, mobile handsets are used in the following description document to represent the end user device. However, the invention applies to any device that end user may use to establish a secure connection with a trusted network entity in the core network, e.g., a laptop, a soft client, a desktop, a PDA or any other device. Furthermore, the Packet Data Gateway (PDG) is used as an example to represent the trusted network entity in the core network and to describe the present invention, however, the invention applies to any network entity node that creates, via a generation process or selection from a predefined list, a Security Key for encryption purposes of messages exchanged in the network. Moreover, Internet Protocol Communication Security (IPCS) is used as an example of an application layer security node to describe the present invention. However, the invention still applies to any network entity that requires knowledge of the Security Key assigned by the trusted network entity. Additionally, Diffie-Hellman (DH) Key is used as a Security Key example to describe the present invention. However, the invention still applies to any security key type that is used in the network for any purpose. Even though IPSec is used in the present invention as the protocol between the IPCS and PDG for the Security Key information exchange, the invention applies to any other protocol that provides high security and eliminates eavesdropping from a third party. For instance, TLS is another protocol that provides a high level of security on the connection and make eavesdropping virtually impossible.

Figure 2:
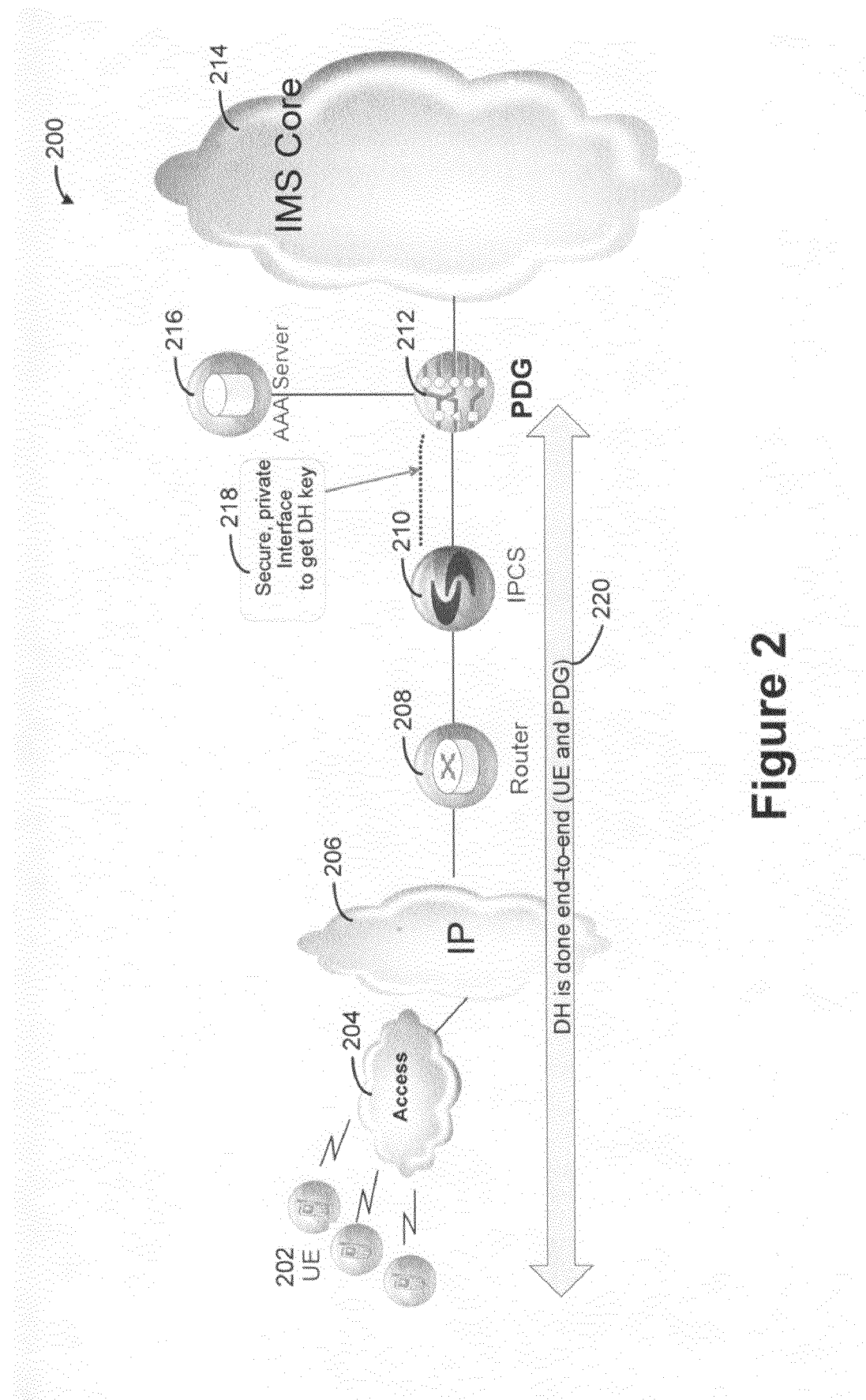
FIG. 2 depicts a network architecture and node connectivity showing the interface between the PDG and the IPCS in accordance with one embodiment of the present invention.

Now referring to FIG. 2, a network architecture 200 and node connectivity showing the interface between the PDG and the IPCS in accordance with one embodiment of the present invention is shown. The access network 204 is used to connect (i.e., communicably couple) the end users 202, such as mobile handsets, to the IP network 206 which in turn provides connection to the border router 208. The border router 208 connects the IP network 206 to the IMS Core network 214 via the IPCS 210 and PDG 212 nodes. The IPCS 210 is also communicably coupled to an AAA Server 216. The IPCS node 210 is positioned inline between the PDG 212 and the border router 206 and has an independent and private interface 218 to the PDG 212 for the Security Key exchange. Although this configuration is used to describe the invention, the present invention also applies to any positioning scenario of the IPCS 210 that allows it to read messages exchanged between the PDG 212 and the end user 202.

The mobile handsets 202 are used to establish calls with the IMS Core 214 for voice and data services. During the call setup procedure, the PDG 204 generates the Diffie-Hellman (DH) Security Key and shares it with the mobile handset 202. This Key is then used to encrypt all packets and messages exchanged between the mobile handset 202 and the PDG 212 for the remainder of the call setup procedure as well as to encrypt packets sent on the IPSec tunnel 220 after the tunnel 220 is established. IPCS 210 is an application layer security node that reads all messages sent between the PDG 212 and the mobile handset 202. This is done simply by decoding each message passing through it. To do so, the IPCS 202 needs to know the DH Key for every call and session the PDG 212 establishes with an end user 202. The DH Key is transferred to the IPCS 210 from the PDG 212 via the secure and private interface 218 that exists exclusively between the IPCS 210 and PDG 212. PDG 212 sends the DH Key as soon as it is generated on a per session basis. The private interface 218 is a private IPSec tunnel connection so that all messages exchanged between the IPCS 210 and PDG 212 are encrypted. IPSec is a proven security and is very resistant to eavesdropping. Hence, no exposure of the messages sent on that interface to the outside network or a third party.

Figure 3:
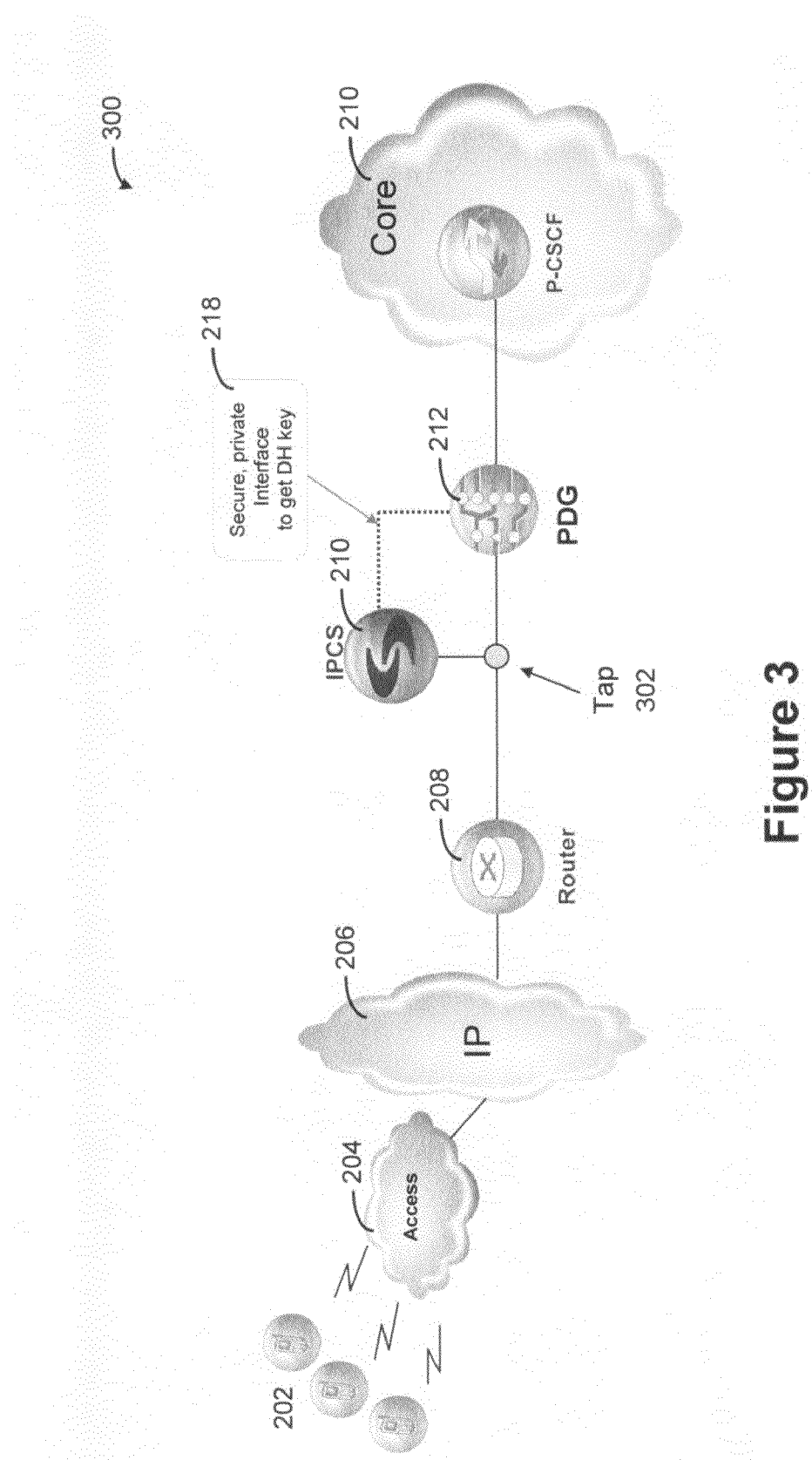
FIG. 3 depicts a network architecture where the IPCS is used in Tap mode in accordance with another embodiment of the present invention.

Referring now to FIG. 3, a network architecture 300 where the IPCS 210 is used in Tap mode in accordance with another embodiment of the present invention is shown. The network architecture 300 is the same as described in reference to FIG. 2, except the IPCS 210 reads messages on the interface between PDG 212 and the border router 208 through a tap device 302 that mirrors all packets on that interface and sends them to the IPCS 210.

Figure 4:
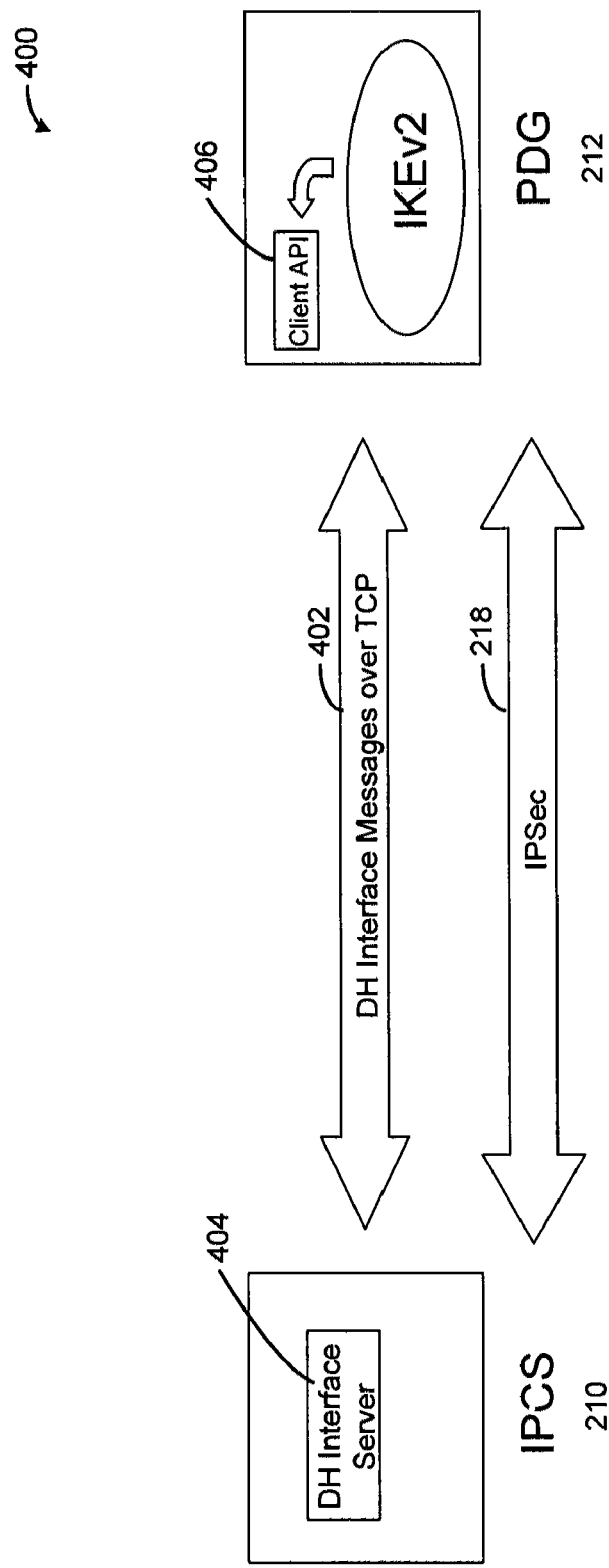
FIG. 4 describes the Security Key exchange interface and high level elements involved in the PDG and IPCS nodes for the DH Key transfer in accordance with the present invention.

Now referring to FIG. 4, the Security Key exchange interface 400 and high level elements involved in the PDG 212 and IPCS 210 for the DH Key transfer in accordance with the present invention are shown. The DH interface 402 between IPCS 210 and PDG 212 consists of two pieces: (1) the TCP Server 404 on IPCS 210; and (2) a TCP Client 406 on PDG 212. The TCP Client 406 on PDG 212 is used for asynchronous event notification and the Client API 406 sends <SPI, Rand_s> to IPCS 210 when PDG 212 receives a new IKE_SAT_INIT message. Using an IPSec tunnel connection 218 between IPCS 210 and PDG 212 ensures the protection of the DH Key from exposure to a third party. Furthermore, the possession of 'rand_s' does not allow a third party attacker to compromise the IMS Session. The third party must possess three pieces of information: X, Y and rand_s. X and Y are sent over the traffic plane between PDG 212 and the end user 202. 'rand_s' is sent in the management plane between PDG 212 and IPCS 210. Once the DH Key is received at the IPCS 210, it is stored in a "Key Vault" entity comprising of high protection inside the hardware. The IPCS 210 can run operations on the Key but cannot extract it and read it. Also, upon hardware tampering or destruction, the Key vault remains closed and the DH key remains un-accessible. With this solution, the DH Key interface 402 between IPCS 210 and PDG 212 does not compromise the IMS security in any way.

The detailed solution of the Security Key exchange interface between the IPCS 210 and PDG 212 will now be described. In all deployments, IPCS 210 is co-located physically very near the PDG 212. Thus, it is possible to have a dedicated point-to-point TCP/IP connection over Ethernet between PDG 212 and IPCS 210. Regarding the Transport session, the DH rand key notification from PDG 212 to IPCS 210 happens via an out-of-band TCP connection 402 between PDG 212 & IPCS 210. This TCP connection 402 is persistent for as long as either node is operational. The IPCS 210 acts as a TCP server and accepts connections from one or more PDG 212. The PDG 212 must re-establish TCP connection 402 upon any TCP connection failure to the IPCS 210. Once the TCP connection 402 is established, the DH Key notification server 404 listens on pre-specified TCP port number (hereinafter referred to as |PORT|).

The protocols used on the DH Key interface 402 between IPCS 210 and PDG 212 will now be described. Every Key Notification message has the following general format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Message Length         |    Version    |   Msg Type    |
+-+-+-+-+-+-+-+-+-+-+-+-+-+-+-+-+-+-+-+-+-+-+-+-+-+-+-+-+-+-+-+-+
|                                                               |
|                       Type specific data                      |
|                                                               |
+-+-+-+-+-+-+-+-+-+-+-+-+-+-+-+-+-+-+-+-+-+-+-+-+-+-+-+-+-+-+-+-+
```

The message length field denotes the total length of the message in bytes. The version field denotes the protocol version (hereinafter referred to as |VERSION|). In reality, the version can be the version of protocol supported by the sender of the message. The "Msg Type" field denotes the type of the message. All 16-bit and 32-bit integers are always in network byte order. All reserved fields are recommended to be zero. An implementation must ignore any non zero value in such reserved fields without flagging any errors. The "type specific data" is restricted to 252 bytes in version |VERSION| of the protocol. Thus, the maximum message size is restricted to 256 bytes.

As part of the DH Key interface 402 protocol, a "keepalive" message is sent periodically by either end at some pre-configured interval to notify each other that the connection is still valid and alive. The recommended interval is 60 seconds. The "keepalive" message format is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Message Length         |    Version    |   Type = 4    |
+-+-+-+-+-+-+-+-+-+-+-+-+-+-+-+-+-+-+-+-+-+-+-+-+-+-+-+-+-+-+-+-+
```

There is no type specific data other than the general header. Thus, the message length is always 4.

Another message defined for the DH Key interface 402 is the "Notify" message, which is used to notify a new key to the IPCS 210. It is general enough to support multiple key types. In the current description, this message supports IKEv2 and Diffie-Hellman random (private) key. The message format is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        Message Length         |    Version    |   Type = 5    |
+-+-+-+-+-+-+-+-+-+-+-+-+-+-+-+-+-+-+-+-+-+-+-+-+-+-+-+-+-+-+-+-+
|      DOI      |  DOI Subtype  |           Reserved            |
+-+-+-+-+-+-+-+-+-+-+-+-+-+-+-+-+-+-+-+-+-+-+-+-+-+-+-+-+-+-+-+-+
|                              SPI                              |
+-+-+-+-+-+-+-+-+-+-+-+-+-+-+-+-+-+-+-+-+-+-+-+-+-+-+-+-+-+-+-+-+
|   Key Type    |    Reserved   |          Key Length           |
+-+-+-+-+-+-+-+-+-+-+-+-+-+-+-+-+-+-+-+-+-+-+-+-+-+-+-+-+-+-+-+-+
|                         ... Key bits ...                      |
+-+-+-+-+-+-+-+-+-+-+-+-+-+-+-+-+-+-+-+-+-+-+-+-+-+-+-+-+-+-+-+-+
```

A Domain of Interpretation (DOI) is also supported. In the present description, only the IKEv2 DoI is described, however additional DOI can easily be added to the protocol. The IKEv2 DOI is denoted by the value "1". The canonical reference for this is RFC 4306 [RFC4306]. A Subtype of the DoI is also supported. In the present description, only the UMA subtype is described, however additional subtypes can easily be added to the protocol. The UMA subtype is denoted by the value "1". The "SPI" filed represent the current IKE SPI from the point of view of PDG 212, in other words the one generated by the PDG 212. The "Key Type" represents the type of Key being notified. It is one of the following:

DH Private key—denoted by the value "1" (one)
DH Shared key (derived)—denoted by the value "2"

The "Key Length" is the length of the key above. The length is encoded in network byte order. The "Key Bits" are the bits of the key (whose type is specified in "Key Type" above). The key bits must be in network byte order.

An additional message defined for the DH Key interface 402 is the "REQUEST" message. In the event of recovery or restart, IPCS 210 makes a request to the PDG 212 to obtain information about established tunnels. This is done by sending a REQUEST message.

In the case where the IKE session has not completed the Tunnel establishment the following applies:
 a. To do both IKE and IPSec monitoring, what is needed is:
  i. Ni, Nr
  ii. SPIi, SPIr
  iii. DH-private key
  iv. Encryption Algo, keylen
  v. Integrity algo, keylen
  vi. prf algo, keylen
  vii. DH-public key of mobile
 b. To do IPSec monitoring only, we need:
  i. SK_d
  ii. shared secret (from DH)
  iii. Ni, Nr
  iv. prf key, keylen and algo In the case where the IKE session has completed Tunnel establishment, the following applies:
 a. To do both IKE and IPSec monitoring, what is needed is:
  i. last Ni, last Nr
  ii. SPIi, SPIr
  iii. IKE encryption algo, keylen
  iv. IKE integrity algo, keylen
  v. IKE prf algo, keylen
  vi. recent SK_d
  vii. recent Shared secret
  viii. IPSec SPIi, SPIr
  ix. IPSec encryption algo, keylen
  x. IPSec integrity algo, keylen
  xi. Traffic selectors and IPAddr(internal)
 b. To do only IPSec monitoring, what is needed is:
  i. SPIi, SPIr
  ii. encryption algo, keylen, key
  iii. integrity algo, keylen, key
  iv. traffic selectors and Internal IPADDR An additional message defined for the DH Key interface 402 is a "RESPONSE" message, which is sent by PDG 212 when it receives a REQUEST message.

As General implementation consideration, the smallest message is the KEEPALIVE_message which is 4 bytes long. The largest message is restricted to 256 bytes. It is recommended that the Nagle algorithm be disabled by both TCP peers for the key exchange connection. This is accomplished by setting "TCP_NODELAY" socket option on the TCP socket.

With regards to Reading Messages from Network, the following code fragment in "C" shows the correct way to read the message length and message:

```
union un
{
    uint8_t buf[2];
    uint16_t len;
} len_buf;
int n = read(fd, len_buf.buf, 2);
uint8_t buf[1024];
uint32_t v;
uint16_t len;
uint8_t type;
if (n != 2)
    error("Unable to read message length\n");
len = ntohs(len_buf.len);
n = read(fd, buf, len);
```

For Connection Establishment, the IPCS 210 listens for a TCP connection on port |PORT| from one or more PDG 212. The IPCS 210 then waits for KEEPALIVE_messages and NOTIFY_messages from the PDG 212. Note that there is no other message sent by the IPCS 210 upon connection establishment.

If the TCP connection to the IPCS 210 is *down*, it is considered a failure and no error messages or alarms are raised on the PDG 212. The PDG 212 must retry connection to the IPCS 210 until it succeeds. It is recommended to have a reasonable timeout interval before attempting re-establishment (e.g., once a second for 5 seconds, followed by once every 5 seconds for 30 seconds, followed by once every 30 seconds for 5 minutes and so on). The PDG 212 will not perform any key notifications until a new TCP connection is successfully established between the IPCS 210 and PDG 212.

Key Notification messages are *always* sent by the PDG 212 and they are sent asynchronously as soon as it generates the DH Rand key (which becomes the DH private key). The PDG 212 should expect no response to the NOTIFY_message. The NOTIFY_message is sent under the following circumstances:

Just before the IKE_SA_INIT response is sent to the Mobile Handset.
Just before responding to an IKEv2 REKEY request (from the handset).
Just before initiating an IKEv2 REKEY request.

The Keepalive messages are sent periodically by either end (IPCS 210 and PDG 212) to inform the other party of connection existence. They serve two purposes: (1) Detecting application failure on the other end and (2) to *refresh* any firewall connection tracking timers (if they exist) at either end. Either party (IPCS 210 or PDG 212) may terminate the TCP connection by calling the underlying TCP API (e.g., socket API's "close( )").

Figure 5:
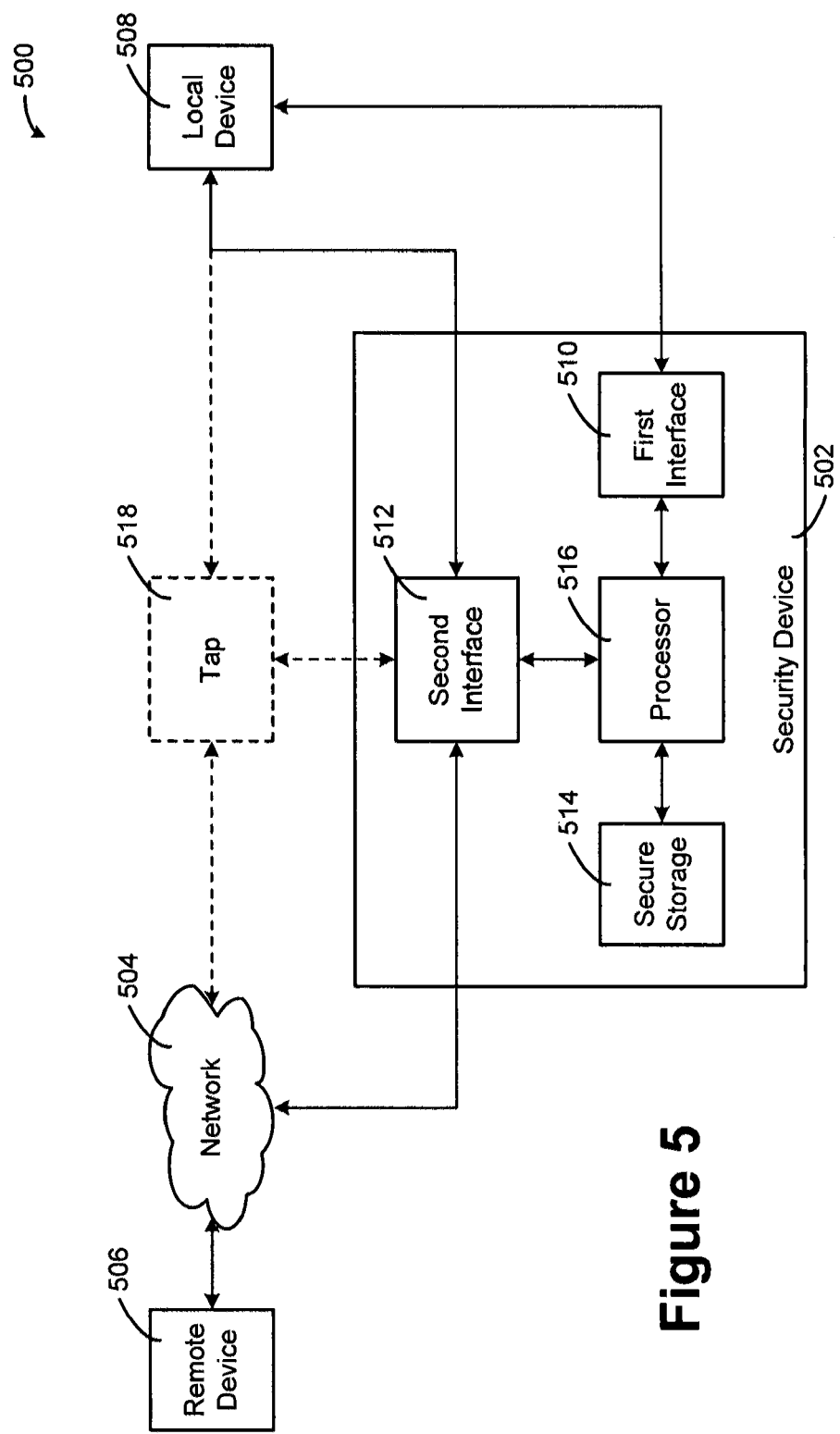
FIG. 5 is a block diagram depicting an apparatus and system in accordance with one embodiment of the present invention.

Referring now to FIG. 5, a block diagram depicting a system 500 and an apparatus 502 in accordance with one embodiment of the present invention are shown. The system 500 includes a network 504, a remote device 506, a local device 508 communicably coupled to the remote device 506 via the network 504 to engage in one or more secure communications, and a security device 502 disposed between the local device 508 and the remote device 506. The security device 502 includes a first interface 510, a second interface 512, a secure data storage 514, and a processor 516 communicably coupled to the first interface 510, the second interface 512 and the secure data storage 514. The processor 516 receives a security key associated with the secure communication(s) at the first interface 510, stores the security key in the secure data storage 514 and decodes one or more messages via the second interface 512 using the security key that are transmitted between the local device 508 and the remote device 506 using the security key. Alternatively, as indicated by the dashed lines, the security device 502 can monitor the secure communication(s) via a tap 518 communicably coupled to the local device 508 and the remote device 506 via network 504. The tap 518 is also communicably coupled to the second interface 512. The system 500 and security device 502 operate in accordance with any of the methods described herein.

Figure 6:
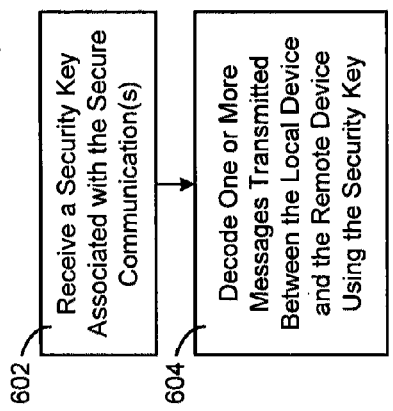
FIG. 6 is a flow chart depicting a method in accordance with one embodiment of the present invention.

Now referring to FIG. 6, a flow chart depicting a method 600 in accordance with one embodiment of the present invention is shown. The present invention receives a security key associated with the secure communication(s) at a security device disposed between the local device and the remote device in block 602 and decodes one or more messages transmitted between the local device and the remote device using the security key in block 604. Note that the present invention can be implemented as a computer program embodied on a computer readable medium wherein each step is performed by one or more code segments.

Figure 7:
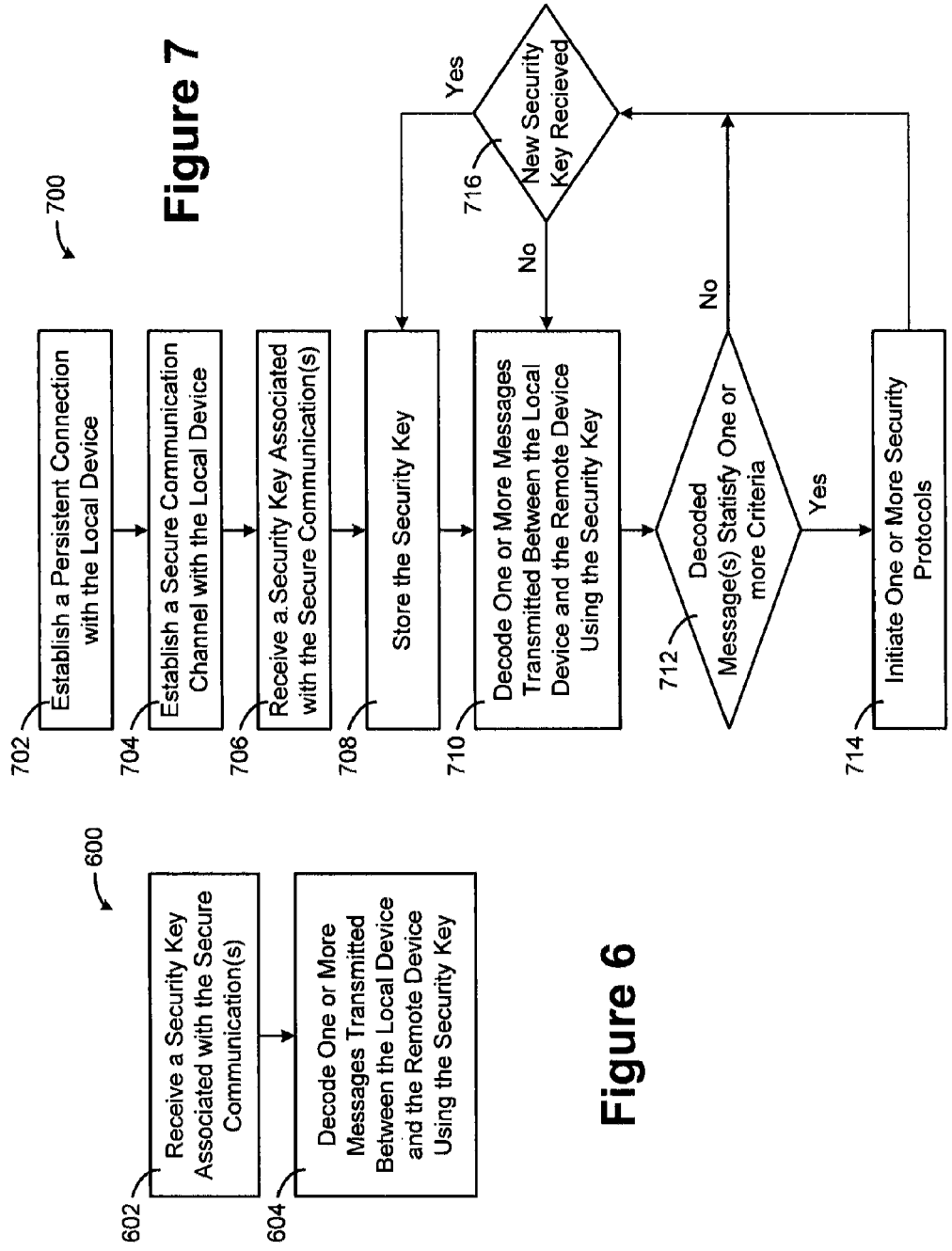
FIG. 7 is a flow chart depicting a method in accordance with another embodiment of the present invention.

Referring now to FIG. 7, a flow chart depicting a method 700 in accordance with another embodiment of the present invention is shown. The security device establishes a persistent connection with the local device in block 702 and establishes a secure communication channel with the local device in block 704. Thereafter, a security key associated with the secure communication(s) is received at the security device disposed between the local device and the remote device in block 706 and the security key is stored in block 708. The security device then decodes one or more messages transmitted between the local device and the remote device using the security key in block 710. If the decoded message(s) satisfy one or more criteria, as determined in decision block 712, one or more security protocols are initiated in block 714. Thereafter, or if the decoded message(s) do not satisfy one or more criteria, as determined in decision block 712, and a new security key is not received in block 716, the process continues decoding messages in block 710 and continues as previously described. If, however, a new security key is received in block 716, the new security key is stored in block 708 and the process continues as previously described. Note that the present invention can be implemented as a computer program embodied on a computer readable medium wherein each step is performed by one or more code segments.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for monitoring two or more secure communications between a trusted local network device and two or more remote devices via a set of first secure communication channels, comprising the steps of:
receiving a security key associated with any of the secure communication(s) between the trusted local network device and the two or more remote devices at a security device via a second secure communication channel whenever the trusted local network device creates or changes the security key, wherein (a) the second secure communication channel is a persistent connection used to transmit all security keys between the security device and the trusted local network device that is independent of the first secure communication channels, and (b) the security device is disposed between the trusted local network device and the two or more remote devices;
storing the security keys in a secure storage communicably coupled to the security device, wherein the stored security keys cannot be extracted or read by the security device;
decoding one or more messages transmitted between the trusted local network device and the two or more remote devices at the security device by performing operations on the stored security keys; and
maintaining the second secure communication channel independently of the set of first communication channels using one or more interface messages sent between the trusted local network device and the security device.

2. The method as recited in claim 1, further comprising the step of initiating one or more security protocols whenever the decoded message(s) satisfy one or more criteria.

3. The method as recited in claim 1, wherein the security device is communicably connected between the trusted local network device and the remote two or more devices, or is communicably connected to a tap communicably connected between the trusted local network device and the remote device.

4. The method as recited in claim 1, further comprising the step of establishing the second secure communication channel between the security device and the trusted local network device.

5. The method as recited in claim 1, wherein the security key is changed on a per session or per call basis.

6. The method as recited in claim 1, further comprising the step of establishing a persistent connection for the second secure communication channel between the security device and the trusted local network device.

7. The method as recited in claim 1, wherein the one or more interface messages comprise a key notification message, a keepalive message, a notify message, a request message or a response message.

8. The method as recited in claim 1, wherein:
the security device comprises an application level security node or an Internet Protocol Communication Security device;
the trusted local network device comprises a packet data gateway;
the packet-based network comprises an Internet Protocol network;
the remote device comprises an end user device, a mobile handset, a computer, a portable computer, a personal data assistant, a multimedia device or a combination thereof; or
the message(s) comprise one or more data packets, voice packets, multimedia packets or a combination thereof.

9. A method for monitoring two or more secure communications between a trusted local network device and two or more remote devices via a set of first secure communication channels, comprising the steps of:
establishing a persistent connection between a security device and the trusted local network device wherein the security device is disposed between the trusted local network device and the two or more remote devices;
establishing a second secure communication channel between the security device and the trusted local network device via the persistent connection that is used to transmit all security keys to the security device and is independent of the set of first secure communication channels;
receiving a security key associated with any of the secure communication(s) between the trusted local network device and the two or more remote devices at the security device via the second secure communication channel, whenever the trusted local network device creates or changes the security key;
storing the security keys in a secure storage communicably coupled to the security device, wherein the stored security keys cannot be extracted or read by the security device;
decoding one or more messages transmitted between the trusted local network device and the two or more remote devices at the security device by performing operations on the stored security keys;
initiating one or more security protocols whenever the decoded message(s) satisfy one or more criteria; and
maintaining the second secure communication channel independently of the set of first communication channels using one or more interface messages sent between the trusted local network device and the security device.

10. A non-transitory computer readable medium for monitoring two or more secure communications between a trusted local network device and two or more remote devices via a set of first secure communication channels, the non-transitory computer readable medium comprising program instructions when executed by a security device causes the security device to perform the steps of:
receiving a security key associated with any of the secure communication(s) between the trusted local network device and the two or more remote devices at the security device via a second secure communication channel whenever the trusted local network device creates or changes the security key, wherein (a) the second secure communication channel is a persistent connection used to transmit all the security keys between the security device and the trusted local network device that is independent of the first secure communication channels, and (b) the security device is disposed between the trusted local network device and the two or more remote devices;
storing the security keys in a secure storage communicably coupled to the security device, wherein the stored security keys cannot be extracted or read by the security device;

decoding one or more messages transmitted between the trusted local network device and the two or more remote devices at the security device by performing operations on the stored security keys; and maintaining the second secure communication channel independently of the set of first communication channels using one or more interface messages sent between the trusted local network device and the security device.

11. A non-transitory computer readable medium for monitoring two or more secure communications between a trusted local network device and two or more remote devices via a set of first secure communication channels, the non-transitory computer readable medium comprising program instructions when executed by a security device causes the security device to perform the steps of:

establishing a persistent connection between a security device and the trusted local network device wherein the security device is disposed between the trusted local network device and the two or more remote devices;

establishing a second secure communication channel between the security device and the trusted local network device via the persistent connection that is used to transmit all security keys to the security device and is independent of the set of first secure communication channels;

receiving a security key associated with any of the secure communication(s) between the trusted local network device and the two or more remote devices at the security device via the second secure communication channel whenever the trusted local network device creates or changes the security key;

storing the security keys in a secure storage communicably coupled to the security device, wherein the stored security keys cannot be extracted or read by the security device;

decoding one or more messages transmitted between the trusted local network device and the two or more remote devices at the security device by performing operations on the stored security keys;

initiating one or more security protocols whenever the decoded message(s) satisfy one or more criteria; and maintaining the second secure communication channel independently of the set of first communication channels using one or more interface messages sent between the trusted local network device and the security device.

12. An apparatus for monitoring two or more secure communications between a trusted local network device and two or more remote devices via a set of secure local-to-remote device communication channels comprising:

a first interface for a secure private communication channel to the trusted local network device that is a persistent connection used to transmit all security keys between the apparatus and the trusted local network device and is independent of the set of secure local-to-remote device communication channels;

a second interface for the set of secure local-to-remote device communication channels;

a secure data storage; and a processor communicably coupled to the first interface, the second interface and the secure data storage wherein the processor: (a) receives a security key at the first interface that is associated with any of the secure communication(s) between the trusted local network device and the two or more remote devices via the secure private channel whenever the trusted local network device creates or changes the security key, (b) stores the security keys in the secure data storage such that the stored security keys cannot be extracted or read by the security device, (c) decodes one or more messages by performing operations on the stored security keys wherein the one or more messages are transmitted between the trusted local network device and the one or more remote devices and are obtained from the set of secure local-to-remote device communication channels via the second interface, and (d) maintains the secure private communication channel independently of the set of secure local-to-remote device communication channels using one or more interface messages sent between the trusted local network device and the security device via the first interface.

13. The apparatus as recited in claim 12, wherein the processor initiates one or more security protocols whenever the decoded message(s) satisfy one or more criteria.

14. The apparatus as recited in claim 12, wherein the processor establishes the secure private communication channel between the security device and the trusted local network device.

15. The apparatus as recited in claim 12, wherein the processor establishes the persistent connection for the secure private communication channel between the security device and the trusted local network device.

16. A security device for monitoring two or more secure communications between a trusted local network device and two or more remote devices via a set of secure local-to-remote device communication channels comprising:

a first interface for a secure private communication channel to the trusted local network device that is a persistent connection used to transmit all security keys between the security device and the trusted local network device and is independent of the set of secure local-to-remote device communication channels;

a second interface for the set of secure local-to-remote device communication channels;

a secure data storage; and a processor communicably coupled to the first interface, the second interface and the secure data storage wherein the processor: (a) establishes the persistent connection with the trusted local network device, (b) establishes the secure private communication channel with the trusted local network device via the persistent connection, (c) receives a security key at the first interface that is associated with any of the secure communication(s) between the trusted local network device and the two or more remote devices via the secure private channel whenever the trusted local network device creates or changes the security key, (d) stores the security keys in the secure data storage such that the stored security keys cannot be extracted or read by the security device, (e) decodes one or more messages by performing operations on the stored security keys wherein the one or more messages are transmitted between the trusted local network device and the remote devices and are obtained from the set of secure local-to-remote device communication channels via the second interface, (f) initiates one or more security protocols whenever the decoded message(s) satisfy one or more criteria, and (g) maintains the secure private communication channel independently of the set of secure local-to-remote device communication channels using one or more interface messages sent between the trusted local network device and the security device via the first interface.

17. A system comprising:
a network;
two or more remote devices;

a trusted local network device communicably coupled to the remote devices via the network to engage in two or more secure communications via a set of secure local-to-remote communication channels;

a security device disposed between the trusted local network device and the two or more remote devices wherein the security device comprises: (1) a first interface for a secure private communication channel to the trusted local network device that is a persistent connection used to transmit all security keys between the trusted local network device and the security device and is independent of the set of secure local-to-remote device communication channels, (2) a second interface for the secure local-to-remote device communication channels, (3) a secure data storage, and (4) a processor communicably coupled to the first interface, the second interface and the secure data storage wherein the processor: (a) receives a security key at the first interface that is associated with any of the secure communication(s) between the trusted local network device and the two or more remote devices via the secure private channel whenever the trusted local network device creates or changes the security key, (b) stores the security keys in the secure data storage such that the stored security keys cannot be extracted or read by the security device, (c) decodes one or more messages by performing operations on the stored security keys wherein the one or more messages are transmitted between the trusted local network device and the two or more remote devices and are obtained from the set of secure local-to-remote device communication channels via the second interface, and (d) maintains the secure private communication channel independently of the set of secure local-to-remote device communication channels using one or more interface messages sent between the trusted local network device and the security device via the first interface.

18. The system as recited in claim 17, wherein the processor initiates one or more security protocols whenever the decoded message(s) satisfy one or more criteria.

19. The system as recited in claim 17, wherein the processor establishes the secure private communication channel between the security device and the trusted local network device.

20. The system as recited in claim 17, wherein the processor establishes the persistent connection for the secure private communication channel between the security device and the trusted local network device.

21. A system comprising:
a network;
two or more remote devices;
a trusted local network device communicably coupled to the remote devices via the network to engage in two or more secure communications via a set of secure local-to-remote communication channels;
a security device disposed between the trusted local network device and the two or more remote devices wherein the security device comprises: (1) a first interface for a secure private communication channel to the trusted local network device that is a persistent connection used to transmit all security keys between the trusted local network device and the security device and is independent of the set of secure local-to-remote device communication channels, (3) a secure data storage, and (4) a processor communicably coupled to the first interface, the second interface and the secure data storage wherein the processor: (a) establishes the persistent connection with the trusted local network device, (b) establishes the secure private communication channel with the trusted local network device via the persistent connection, (c) receives a security key at the first interface that is associated with any of the secure communication(s) between the trusted local network device and the two or more remote devices via the secure private channel whenever the trusted local network device creates or changes the security key, (d) stores the security keys in the secure data storage such that the stored security keys cannot be extracted or read by the security device, (e) decodes one or more messages by performing operations on the stored security keys wherein the one or more messages are transmitted between the trusted local network device and the remote devices and are obtained from the set of secure local-to-remote device communication channels via the second interface, (f) initiates one or more security protocols whenever the decoded message(s) satisfy one or more criteria, and (g) maintains the secure private communication channel independently of the set of secure local-to-remote device communication channels using one or more interface messages sent between the trusted local network device and the security device via the first interface.

* * * * *

UNITED STATES PATENT AND TRADEMARK OFFICE
CERTIFICATE OF CORRECTION

| | | |
|---|---|---|
| PATENT NO. | : 8,185,947 B2 | Page 1 of 1 |
| APPLICATION NO. | : 11/776509 | |
| DATED | : May 22, 2012 | |
| INVENTOR(S) | : Srikrishna Kurapati and Sudhindra Pundaleeka Herle | |

It is certified that error appears in the above-identified patent and that said Letters Patent is hereby corrected as shown below:

On the Title page: Item (54), line 3, and in Column 1, Line 3, please delete "A" and insert --AN-- therein.

Signed and Sealed this
First Day of January, 2013

David J. Kappos
*Director of the United States Patent and Trademark Office*